(12) United States Patent
Edsinger

(10) Patent No.: US 9,744,678 B2
(45) Date of Patent: Aug. 29, 2017

(54) METHODS AND SYSTEMS TO PROVIDE FEEDBACK BASED ON A MOTION PER PATH METRIC INDICATIVE OF AN EFFECT OF MOTION ASSOCIATED WITH COMPONENTS OF A ROBOTIC DEVICE

(71) Applicant: X Development LLC, Mountain View, CA (US)

(72) Inventor: Aaron Edsinger, Mountain View, CA (US)

(73) Assignee: X DEVELOPMENT LLC, Mountain View, CA (US)

(*) Notice: Subject to any disclaimer, the term of this patent is extended or adjusted under 35 U.S.C. 154(b) by 0 days.

(21) Appl. No.: 15/165,160

(22) Filed: May 26, 2016

(65) Prior Publication Data

US 2016/0263752 A1  Sep. 15, 2016

Related U.S. Application Data

(63) Continuation of application No. 14/559,134, filed on Dec. 3, 2014, now Pat. No. 9,375,853.

(51) Int. Cl.
*B25J 19/00* (2006.01)
*B25J 19/06* (2006.01)
*B25J 13/08* (2006.01)

(52) U.S. Cl.
CPC ............ *B25J 19/06* (2013.01); *B25J 13/08* (2013.01); *Y10S 901/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,786,847 A * | 11/1988 | Daggett | ............... | B25J 9/1633 318/568.2 |
| 4,868,474 A * | 9/1989 | Lancraft | ............ | G05B 19/4141 318/562 |
| 5,343,391 A * | 8/1994 | Mushabac | .......... | A61C 13/0004 433/72 |
| 7,600,906 B2 * | 10/2009 | Chon | .................... | F21S 10/005 362/276 |
| 7,765,780 B2 * | 8/2010 | Koselka | ................. | A01D 46/30 56/10.2 A |

(Continued)

*Primary Examiner* — Jonathan L Sample
(74) *Attorney, Agent, or Firm* — McDonnell Boehnen Hulbert & Berghoff LLP

(57) ABSTRACT

Examples are provided that describe a motion based light display for a robotic arm. In one example, a robotic device comprising one or more components configured to be actuated for movement. The robotic device also includes one or more processors are configured to determine a motion per path metric of the one or more components based on a motion plan associated with the robotic device. The one or more processors are configured to determine one or more feedback characteristics based on the motion per path metric. The one or more feedback characteristics include information indicative of an effect of motion associated with the one or more components. The robotic device also includes an indicator coupled to the one or more components and configured to provide feedback about the one or more components based on the feedback characteristics indicative of the effect of motion.

16 Claims, 11 Drawing Sheets

(56) References Cited

U.S. PATENT DOCUMENTS

| | | | | |
|---|---|---|---|---|
| 8,594,841 B2* | 11/2013 | Zhao | B25J 9/1633 | 318/566 |
| 8,965,563 B2* | 2/2015 | Eldershaw | B65G 47/00 | 700/218 |
| 9,186,793 B1* | 11/2015 | Meier | B25J 9/1694 | |
| 9,375,841 B1* | 6/2016 | Kemper | B25J 13/085 | |
| 2006/0293617 A1* | 12/2006 | Einav | A61H 1/0274 | 601/33 |
| 2007/0100214 A1* | 5/2007 | Steinert | A61H 1/00 | 600/300 |
| 2007/0197896 A1* | 8/2007 | Moll | A61B 1/00039 | 600/407 |
| 2007/0282228 A1* | 12/2007 | Einav | A63B 21/4021 | 601/33 |
| 2007/0299371 A1* | 12/2007 | Einav | A63B 21/4021 | 601/5 |
| 2008/0009970 A1* | 1/2008 | Bruemmer | G05D 1/0088 | 700/245 |
| 2009/0062813 A1* | 3/2009 | Prisco | A61B 34/37 | 606/130 |
| 2009/0281661 A1* | 11/2009 | Dooley | B60L 3/106 | 700/258 |
| 2009/0326556 A1* | 12/2009 | Diolaiti | A61B 1/00009 | 606/130 |
| 2010/0036384 A1* | 2/2010 | Gorek | A61B 34/20 | 606/104 |
| 2010/0131101 A1* | 5/2010 | Engeberg | A61F 2/583 | 700/258 |
| 2010/0135760 A1* | 6/2010 | Hjornet | B25J 15/0616 | 414/744.8 |
| 2011/0035050 A1* | 2/2011 | Kim | B25J 9/1666 | 700/246 |
| 2011/0035053 A1* | 2/2011 | Guochunxu | B25J 9/1664 | 700/255 |
| 2011/0035087 A1* | 2/2011 | Kim | B25J 9/1666 | 701/25 |
| 2011/0063417 A1* | 3/2011 | Peters, II | G06T 7/85 | 348/47 |
| 2011/0178532 A1* | 7/2011 | Amiri | A61M 25/0147 | 606/130 |
| 2011/0224815 A1* | 9/2011 | Sonner | B25J 9/1664 | 700/97 |
| 2011/0300994 A1* | 12/2011 | Verkaaik | A61H 1/0274 | 482/51 |
| 2012/0253507 A1* | 10/2012 | Eldershaw | B65G 47/00 | 700/218 |
| 2012/0330325 A1* | 12/2012 | Devengenzo | A61B 19/2203 | 606/130 |
| 2013/0041292 A1* | 2/2013 | Cunningham | A61B 18/12 | 601/2 |
| 2013/0345872 A1* | 12/2013 | Brooks | B25J 9/0087 | 700/259 |
| 2014/0005682 A1* | 1/2014 | Worrell | A61B 17/320092 | 606/130 |
| 2014/0015186 A1* | 1/2014 | Wessel | B23Q 1/037 | 269/97 |
| 2014/0067121 A1* | 3/2014 | Brooks | B25J 9/1676 | 700/255 |
| 2014/0194897 A1* | 7/2014 | Kirschenman | A61B 17/2909 | 606/130 |
| 2014/0196366 A1* | 7/2014 | Teasdale | A01G 9/10 | 47/66.7 |
| 2014/0202859 A1* | 7/2014 | Coope | G01N 27/44721 | 204/461 |
| 2014/0243851 A1* | 8/2014 | Cohen | A61M 25/0133 | 606/130 |
| 2014/0305994 A1* | 10/2014 | Parihar | A61B 17/115 | 227/180.1 |
| 2015/0226369 A1* | 8/2015 | Troy | F16M 11/18 | 180/2.1 |

* cited by examiner

METHODS AND SYSTEMS TO PROVIDE FEEDBACK BASED ON A MOTION PER PATH METRIC INDICATIVE OF AN EFFECT OF MOTION ASSOCIATED WITH COMPONENTS OF A ROBOTIC DEVICE

CROSS-REFERENCE TO RELATED APPLICATION

This patent disclosure is a continuation of U.S. patent application Ser. No. 14/559,134, filed on Dec. 3, 2014, the entire contents of which are herein incorporated by reference.

BACKGROUND

Unless otherwise indicated herein, the materials described in this section are not prior art to the claims in this application and are not admitted to be prior art by inclusion in this section.

Robotic devices may be used for applications involving material handling, transportation, welding, assembly, and dispensing, among others. Over time, the manner in which these robotic systems operate is becoming more intelligent, efficient, and more intuitive. Robotic devices are being expected to move and operate to perform new tasks and functions. A demand for efficient robotic devices has helped open up a field of innovation in actuators, movement, sensing techniques, as well as component design and assembly. As the use of robotic devices becomes increasingly prevalent in numerous aspects of modern life, the need for increased collaboration between humans and robotic devices becomes apparent.

SUMMARY

In one example, a robotic device comprises one or more components configured to be actuated for movement. The robotic device may include one or more processors configured to determine a motion per path metric of the one or more components based on a motion plan associated with the robotic device. The one more processors may be configured to determine one or more feedback characteristics based on the motion per path metric. The one or more feedback characteristics may include information indicative of an effect of motion associated with the one or more components. The robotic device may include an indicator coupled to the one or more components and configured to provide feedback about the one or more components based on the feedback characteristics indicative of the effect of motion.

In another example, a robotic device comprises one or more actuators coupled through one or more joints to form one or more components. The robotic device may include one or more processors configured to determine a motion per path metric of the one or more components based on an operation of the robotic device. The one or more processors may be configured to determine one or more feedback characteristics based on the motion per path metric. The one or more feedback characteristics include information indicative of an effect of motion associated with the one or more components. The robotic device may include an indicator coupled to the one or more components to provide feedback about the one or more components. The robotic device may also include a controller programmable to control the indicator coupled to the one more components to provide feedback indicative of the effect of motion according to the one or more feedback characteristics.

In another example, a method includes receiving an input indicative of operational information associated with a robotic device. The method also includes determining a motion per path metric at one or more positions of the robotic device according to the operational information. Based on the motion per path metric, the method includes determining, by one or more processors, one or more feedback characteristics. The one or more feedback characteristics vary according to an effect of motion at the one or more positions. The method also includes providing, to an indicator coupled to the robotic device, information indicative of the one or more feedback characteristics.

In another example, a system includes means for receiving an input indicative of operational information associated with a robotic device. The system also includes means for determining a motion per path metric at one or more positions of the robotic device according to the operational information. Based on the motion per path metric, the system includes means for determining, by one or more processors, one or more feedback characteristics. The one or more feedback characteristics vary according to an effect of motion at the one or more positions. The system also includes means for providing, to an indicator coupled to the robotic device, information indicative of the one or more feedback characteristics.

These as well as other aspects, advantages, and alternatives, will become apparent to those of ordinary skill in the art by reading the following detailed description, with reference where appropriate to the accompanying figures.

DETAILED DESCRIPTION

Figure 1:
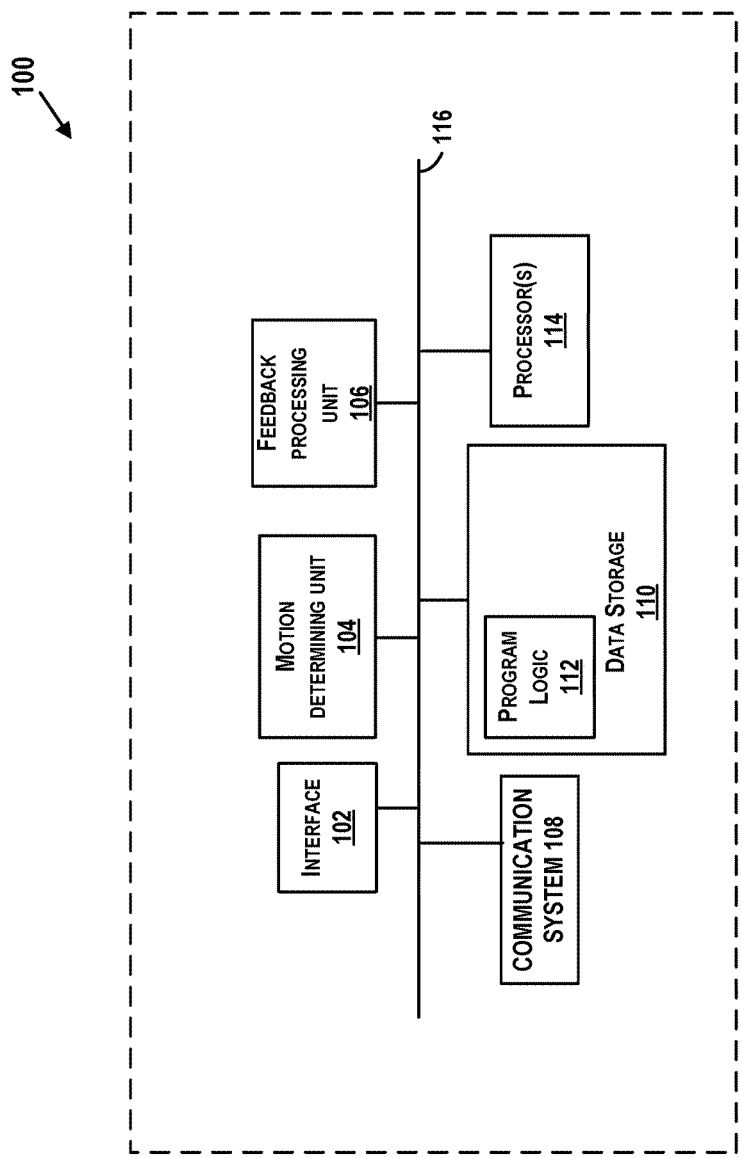
FIG. 1 is a block diagram of a computing device according to an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, a robotic device may include one or more components configured to be actuated for movement. The one or more components may be used to perform multiple operations associated with the robotic device. In one example, a given operation of the multiple operations may include the assembly of a frame of a vehicle.

Within examples, the robotic device may include one or more processors configured to determine a motion per path metric of the one or more components. In one embodiment, the motion per path metric is based on a speed and a mass associated with the one or more components of the robotic device. By way of example, in order to determine the motion per path metric, the one or more processors may be configured to determine the motion per path metric prior to the start of a given operation based on a motion plan.

As a specific example, a gripper tool may be coupled to the robotic device in order to assist with lifting an item nearby the robotic device. The one or more processors may determine the motion per path metric associated with the gripper tool based on subsequent steps defined according to the motion plan in order to determine an associated safety of motion of the gripper tool.

Within examples, the one or more processors may be configured to determine one or more feedback characteristics based on the motion per path metric. In one embodiment, the one or more feedback characteristics include information indicative of an effect of motion associated with the one or more components. In another embodiment, the one or more feedback characteristics correspond to information indicative of one or more of a visual signal, an aural signal, and a haptic signal.

In other examples, the robotic device includes an indicator coupled to the one or more components and configured to provide feedback about the one or more components. The indicator may be configured to provide the feedback based on the feedback characteristics indicative of the effect of motion. In one example, the feedback characteristics may be associated with a given color in order to demonstrate the safety level associated with approaching the robotic device.

By way of example, the indicator may receive feedback characteristics that correspond to a visual signal. In this example, the indicator may display a color red to inform an individual to maintain a given distance to the robotic device during a given operation associated with the robotic device. In another example, the indicator may display a color blue to inform an individual that it is safe to approach the robotic device during a given operation associated with the robotic device.

Referring to the Figures, FIG. 1 is a block diagram of a computing device 100, according to an example embodiment. In some examples, some components illustrated in FIG. 1 may be distributed across multiple computing devices (e.g., desktop computers, servers, hand-held devices, etc.). However, for the sake of the example, the components are shown and described as part of one example device. The computing device 100 may include an interface 102, a motion determining unit 104, a feedback processing unit 106, a communication system 108, data storage 110, and a processor 114. Components illustrated in FIG. 1 may be linked together by a communication link 116. In some examples, the device 100 may include hardware to enable communication within the computing device 100 and another computing device (not shown).

The interface 102 may be configured to allow the computing device 100 to communicate with another computing device (not shown). Thus, the interface 102 may be configured to receive input data from one or more devices. In some examples, the interface 102 may also maintain and manage records of data received and sent by the computing device 100. In other examples, records of data may be maintained and managed by other components of the computing device 100. The interface 102 may also include a receiver and transmitter to receive and send data. In some examples, the interface 102 may also include a user-interface, such as a keyboard, microphone, touch screen, etc., to receive inputs as well. Further, in some examples, the interface 102 may also include interface with output devices such as a display, speaker, etc.

By way of example, the interface 102 may receive an input indicative of operational information associated with the robotic device. In this example, the operational information may help to determine various components of the robotic device that may be dangerous according to the motion per path metric. In one embodiment, the operational information comprises one or more of power requirements associated with the robotic device, geometric information associated with one or more components of the robotic device, and a motion plan associated with the robotic device.

The motion determining unit 104 may be configured to determine the safety of an operation associated with the robotic device. Based on the operation, the motion determining unit 104 may determine a motion per path metric at one or more positions of the robotic device according to the operational information. Further, the motion determining unit 104 may be configured to determine a force associated with the motion per path metric.

In one embodiment, the motion determining unit 104 may contain instructions that determine the force based on an open kinematic chain. The dynamic model may be based on:

$$M(q)\ddot{q}+C(q,\dot{q})\dot{q}+g(q)=\tau_{Total}. \quad [1]$$

In equation [1], the generalized coordinates q can be associated to the position of the links of the robotic device. M(q) is the symmetric, positive definite inertia matrix, the Coriolis and centrifugal terms are factorized using the matrix $C(q, \dot{q})$ of Christoffel symbols, and g(q) is the gravity vector. In the right-hand side of equation [1], $\tau_{Total}$ contains all active generalized torques performing working on q and all dissipative torques. From the skew-symmetry of matrix $\dot{M}(q)+2C(q, \dot{q})$ it follows that:

$$\dot{M}(q)=C(q,\dot{q})+C^T(q,\dot{q}). \quad [2]$$

The total energy of the robotic device is the sum of its kinetic energy and potential energy due to gravity:

$$E = T + U = \frac{1}{2}\dot{q}^T M(q)\dot{q} + U_g(q), \quad [3]$$

with $g(q)=(\partial U_g(q)/\partial q)^T$. From equation [1] and equation [2], it is $$\dot{E}=\dot{q}^T\tau_{Total}, \quad [3]$$

which represents the energy balance in the system. The generalized momentum of the robot is defined as $$p=M(q)\dot{q}. \quad [4]$$

Using again equation [1] and equation [2], the force is given by $$\dot{p}=\tau_{Total}+C^T=(q,\dot{q})\dot{q}-g(q). \quad [5]$$

Thus, the motion determining unit 104 may be configured to determine the force, as shown in equation [5], that is associated with the motion per path metric.

In another example, the motion determining unit 104 may also be configured to determine an applied pressure associated with the motion per path metric. In this example, the applied pressure may be helpful in order to take into consideration a sharp radius associated with a given component of the robotic device. For instance, a given joint of the robotic device may have a larger radius of curvature and thereby have the potential to cause less harm than a given manipulator of the robotic device with an associated smaller radius of curvature.

Within examples, the motion determining unit 104 may also be configured to determine a given motion per path metric of a plurality of motion per path metrics associated with a plurality of positions of the robotic device that exceeds a threshold by the greatest amount. In one example, the given motion per path metric may be determined according to a mass and a velocity associated with a potential point of contact, the geometric information associated with the potential point of contact, and mechanical properties associated with the potential point of contact such as stiffness, compliance, etc. Determining the given motion per path metric that exceeds the threshold by the greatest amount may be helpful in providing feedback in order to improve safety associated with the robotic device.

The feedback processing unit 106 may be configured to receive the motion per path metric and determine one or more feedback characteristics based on the motion per path metric. In one example, the one or more feedback characteristics vary according to an effect of motion at the one or more positions of the robotic device. In one instance, the one or more feedback characteristics may be updated based on the force being greater than or less than a threshold.

By way of example, if the motion per path metric is determined to be greater than a threshold that could cause injury to an individual depending on contact occurring between the individual and the component, then the feedback characteristics may vary according to one or more of color and luminous intensity. In this example, the feedback characteristics may be associated with the color red. In another example, the force may be less than the threshold and the feedback characteristics may be associated with the color blue in order to indicate safety. Other examples are possible as well.

The communication system 108 may include a wired communication interface (e.g., parallel port, USB, etc.) and/or a wireless communication interface (e.g., antenna, transceivers, etc.) to receive and/or provide signals from/to external devices. In some examples, the communication system 108 may receive instructions for operation of the computing device 100. Additionally or alternatively, in some examples, the communication system 108 may provide output data. In one example, the communication system 108 may be configured to provide, to an indicator coupled to the robotic device, information indicative of the one or more feedback characteristics.

In one embodiment, the indicator coupled to the robotic device comprises a visual indicator. By way of example, the feedback characteristics may correspond to an image depicting a red octagon. The image depicting the red octagon may serve to inform an individual of a current safety level associated with the robotic device. In this example, the individual may infer that it is not safe to approach the robotic device while the image is displayed on the visual indicator.

The data storage 110 may store program logic 112 that can be accessed and executed by the processor(s) 114. The program logic 112 may contain instructions that provide control to one or more components of the computing device 100. For example, program logic 112 may provide instructions that adjust the motion plan of the robotic device in order to determine a different motion per path metric. The data storage 110 may comprise one or more volatile and/or one or more non-volatile storage components, such as optical, magnetic, and/or organic storage, and the data storage may be integrated in whole or in part with the processor(s) 114.

The processor(s) 114 may comprise one or more general-purpose processors and/or one or more special-purpose processors. To the extent the processor 114 includes more than one processor, such processors may work separately or in combination. For example, a first processor may be configured to operate the motion determining unit 104, and a second processor of the processors 114 may operate the feedback processing unit 106.

Still further, while each of the components are shown to be integrated in the computing device 100, in some embodiments, one or more components may be removably mounted to otherwise connected (e.g., mechanically or electrically) to the computing device 100 using wired or wireless connections. The computing device 100 may take other forms as well.

Figure 2:
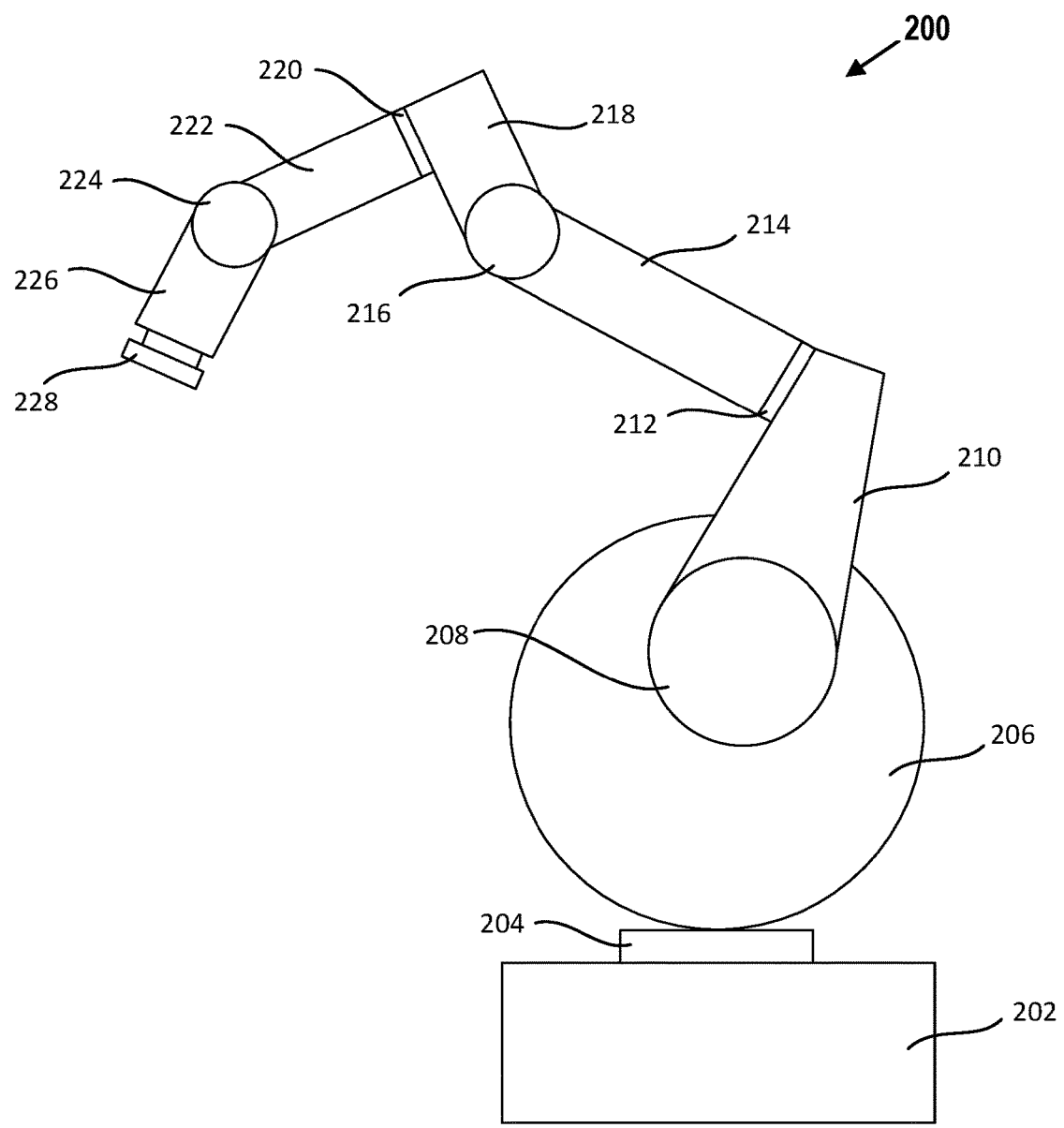
FIG. 2 illustrates an example robotic device.

FIG. 2 illustrates an example robotic device 200. The robotic device 200 may contain hardware, such as a processor, memory or storage, and sensors that enable the robotic device 200 to operate the robotic device 200 for use in assembly operations, pick and place work, spot welding, etc. In one embodiment, the robotic device 200 comprises one or more actuators coupled through one or more joints to form one or more components. The robotic device 200 may be powered by various means such as electric motor, pneumatic motors, hydraulic motors, etc. The robotic device 200 includes a base 202, links 206, 210, 214, 218, 222, and 226, joints 204, 208, 212, 216, 220, and 224, and manipulator 228.

The base 202 may provide a platform in order to provide support for the robotic device 200. The base 202 may be stationary or be coupled to wheels in order to provide movement of the robotic device 200. The base 202 may comprise any number of materials such as aluminum, steel, stainless steel, etc., that may be suitable for a given environment associated with the robotic device 200.

The links 206, 210, 214, 218, 222, and 226 may be configured to be moved according to a programmable set of instructions. For instance, the links may be configured to follow a predetermined set of movements in order to accomplish a repetitive task over a period of time. By way of example, the links 206, 210, 214, 218, 222, and 226 may form a kinematic chain that defines relative movement of a given link of links 206, 210, 214, 218, 222, and 226 at a given joint of the joints 204, 208, 212, 216, 220, and 224.

The joints 204, 208, 212, 216, 220, and 224 may be configured to rotate through the use of a mechanical gear system. In one example, the mechanical gear system may be driven by a strain wave gearing, a cycloid drive, etc. The mechanical gear system selected would depend on a number of factors related to the operation of the robotic device 200 such as the length of the given link of the links 206, 210, 214, 218, 222, and 226, speed of rotation, desired gear reduction, etc. Providing power to the joints 204, 208, 212, 216, 220, and 224 will allow for the links 206, 210, 214, 218, 222, and 226 to be moved in a way that allows the manipulator 228 to interact with an environment.

The manipulator 228 may be configured to allow the robotic device 200 to interact the environment. In one example, the manipulator 228 may perform appropriate placement of an element through various operations such as lifting, maneuvering, and gripping etc. By way of example, the manipulator may be exchanged for another end effector that would provide the robotic device 200 with different functionality.

The robotic device 200 may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications.

Figure 3:
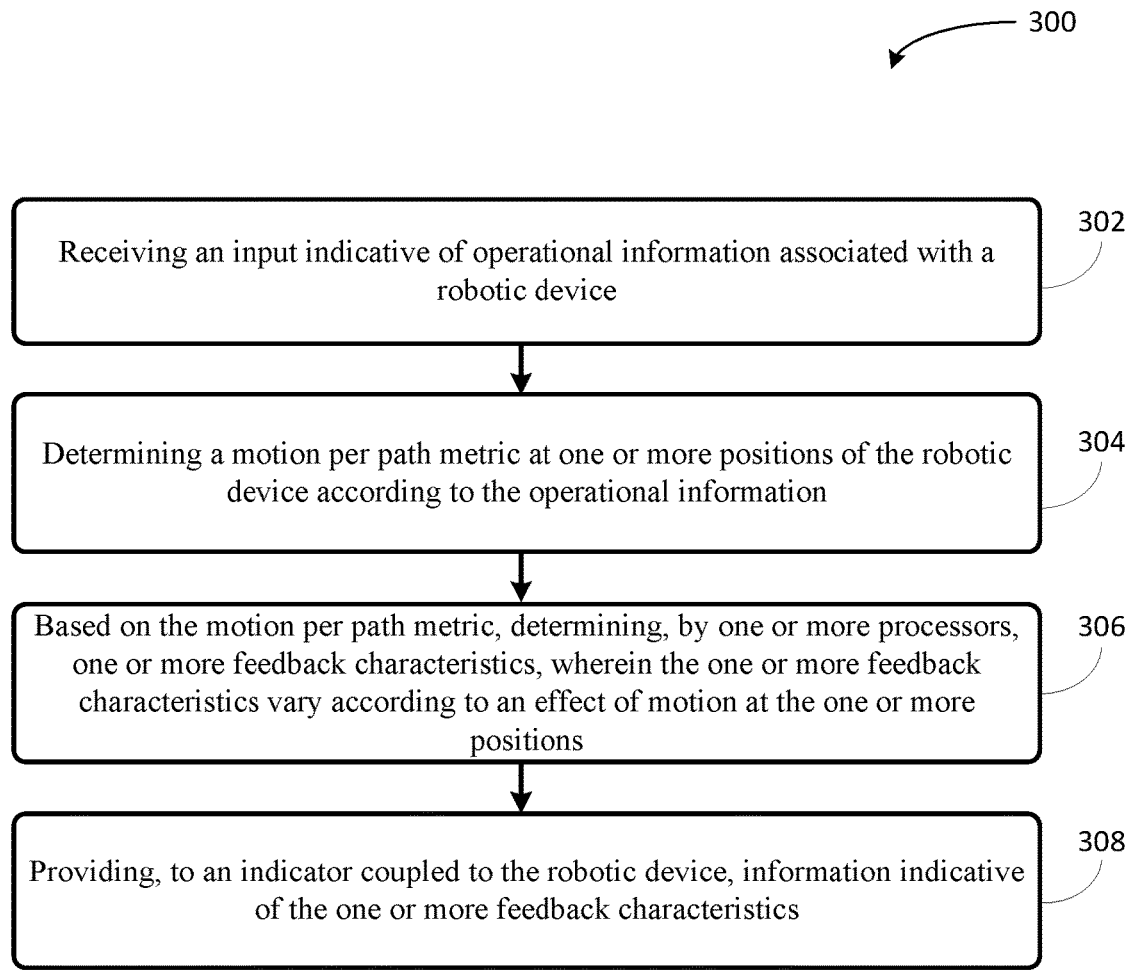
FIG. 3 is a block diagram of an example method for providing motion based feedback indicators for a robotic arm.

FIG. 3 is a block diagram of an example method for providing motion based feedback indicators for a robotic arm, in accordance with at least some embodiments described herein. Method 300 may include one more operations, functions, or actions as illustrated by one or more of blocks 302-308. Although the blocks are illustrated in a sequential order, these blocks may in some instances be performed in parallel, and/or in a different order than those described therein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical functions in the process.

Illustrative methods, such as method 300, may be carried out in whole or in part by a component or components in the cloud and/or a robotic system, such as by the one or more of the components of the computing device 100 shown in FIG. 1. However, it should be understood that example methods, such as method 300, may be carried out by other entities or combinations of entities (i.e., by other computing devices and/or combinations of computing devices), without departing from the scope of the invention.

For example, functions of the method 300 may be fully performed by a computing device (or components of a computing device such as one or more processors), or may be distributed across multiple components of the computing device, across multiple computing devices, and/or across a server. In some examples, the computing device may receive information from sensors of the computing device, or where the computing device is a server the information can be received from another device that collects the information.

As other examples, the method 300 may be performed by a computing device, by a server, or by a robotic device.

As shown by block 302, method 300 includes receiving an input indicative of operational information associated with a robotic device. In one embodiment, the operational information comprises one or more of power requirements associated with the robotic device, geometric information associated with one or more components of the robotic device, and a motion plan associated with the robotic device.

A geometric model of the robotic device may comprise a plurality of known end effectors configured to be coupled to the robotic device. For instance, a given known end effector of the plurality of known end effectors may be used for assembly of a frame associated with a vehicle. In other examples, another known end effector may be used for welding operations.

In one instance, the motion plan is based on an operation of the robotic device. By way of example, the motion plan may include motion based information such as various operation modes, range of speed, range of motion, and torque associated with the robotic device. In another example, the motion based information associated with a component of the robotic device may also be received by one or more computing devices.

By way of example, the operational characteristics of the robotic device may include information that corresponds to the length, weight, and material used with the given component of the robotic device. In another example, the operational characteristics of the robotic device may include information such as the maximum and minimum speed associated with a given joint of the robotic device. Further, the operational characteristics such as the amount of torque associated with the given joint may also be provided to the one or more computing devices.

Within examples, the operational information may comprise information associated with components of the robotic device such as type of material, component covers, mass associated with each component, etc. By way of example, the operational information may comprise load bearing information, transmission stiffness, stiffness of the robotic device covers, and radius of curvature of the robotic device covers.

The plurality of known end effectors may fall into various categories such as grippers, material removal tools, welding tools, etc. In one example, the one or more processors may be configured to receive the input indicative of the operational information associated with a robotic device by interface 102 of computing device 100 as shown in FIG. 1.

As shown by block 304, the method 300 includes determining a motion per path metric at one or more positions of the robotic device according to the operational information. In one example, the motion per path metric may be calculated using equations 1-4 above, and the motion per path metric is an output of equation 4. In one instance, the one or more processors may be configured to determine the motion per path metric at one or more positions according to the steps associated with the motion plan.

In another example, the motion per path metric associated with a given position of the one more positions comprises calculating one or more of an inertia, velocity, and radius of curvature associated with the component. The motion per path metric may be calculated at any number of locations associated with a given component of the robotic device. For instance, the manipulator may have a higher motion per path metric based on the shape associated with the manipulator.

The one or more processors may receive inputs that adjust the operation of the robotic device. Adjusting the operation of the robotic device may allow for the adjustment of one or more variables associated with components of the robotic device. For example, the speed of the object may be reduced in order to decrease the force associated with the motion per path metric of a given component.

In another example, the operation of the robotic device may be adjusted in order to determine an optimal path for a given component to traverse. In one embodiment, the optimal path is based on safety associated with the given component so as to minimize risk during motion of the given component. In this embodiment, it may be possible to adjust a position of one or more other components of the robotic device in order to determine the optimal path for the given component.

As shown by block 306, method 300 includes based on the motion per path metric, determining, by one or more processors, one or more feedback characteristics, wherein the one or more feedback characteristics vary according to an effect of motion at the one or more positions.

In one example, the motion per path metric is determined according to a motion plan associated with the robotic device. In another example, the motion per path metric may be calculated according to the equation 4 from above. The calculation may include one or more of inertia, velocity and radius of curvature associated with a given link.

In another example, the feedback characteristics may be determined according to whether a force associated with the motion per path metric could cause an individual to fall down. For instance, a force of 75 Newtons may not cause injury to a lower leg of an individual however that same force may result in the individual losing balance and as a result of losing balance cause the individual to fall. In this example, the resulting fall could cause severe injury and therefore the feedback characteristics could be determined according to account for a potential accident involving a fall.

As shown by block 308, method 300 includes providing, to an indicator coupled to the robotic device, information indicative of the one or more feedback characteristics.

In one embodiment, the information indicative of the one or more feedback characteristics further comprises one or more visual characteristics. In this embodiment, the one or more visual characteristics are indicative of a proximity perimeter area related to operation of the robotic device. For example, a given visual characteristics may be associated with the color red. In this example, the color red may be displayed on the indicator and serve to inform an individual to maintain a minimum of a 20 foot distance around the robotic device in order to avoid injury. The one or more visual characteristics may be used to prevent injury associated with a potential contact between the robotic device and an individual during a given operation of the robotic device.

By way of example, the one or more processors are configured to determine a force associated with the motion per path metric at the one or more positions. Based on the force, the one or more processors may be configured to determine that the force is greater than a threshold at one or more steps of a motion plan associated with the robotic device. In this example, the one or more steps are associated with a given operation. Further, the one or more processors may be configured to determine a time period prior to a start of the given operation. Based on the time period, a visual indicator coupled to robotic device may be adjusted to display a given color. In this instance, the given color is associated with an upcoming operation of the robotic device.

In one example, a given force may be above a threshold that could cause injury to the individual based on the height of the given link during the range of motion. For instance, a force of 45 Newtons may not cause injury to a lower extremity on an individual such as a thigh or foot of the individual. However, the force of 45 Newtons may cause injury to the neck of the individual and therefore it may be useful to know a vertical displacement associated with the given link. By way of example, based on the motion plan of the robotic device, it may be possible to determine the height or vertical measurement of the given link during the range of motion in order to determine whether a force is greater than or less than a safety threshold. In this example, the safety threshold could be based on the vertical measurement associated with the range of motion.

In another example, the one or more processors are configured to determine a force associated with the motion per path metric at the one or more positions and map the force within a given range of one or more ranges. In this example, the one or more ranges are associated with a visual characteristic. Further, an indicator coupled to the robotic device may be adjusted according to the visual characteristic associated with the given range.

Figure 4A:
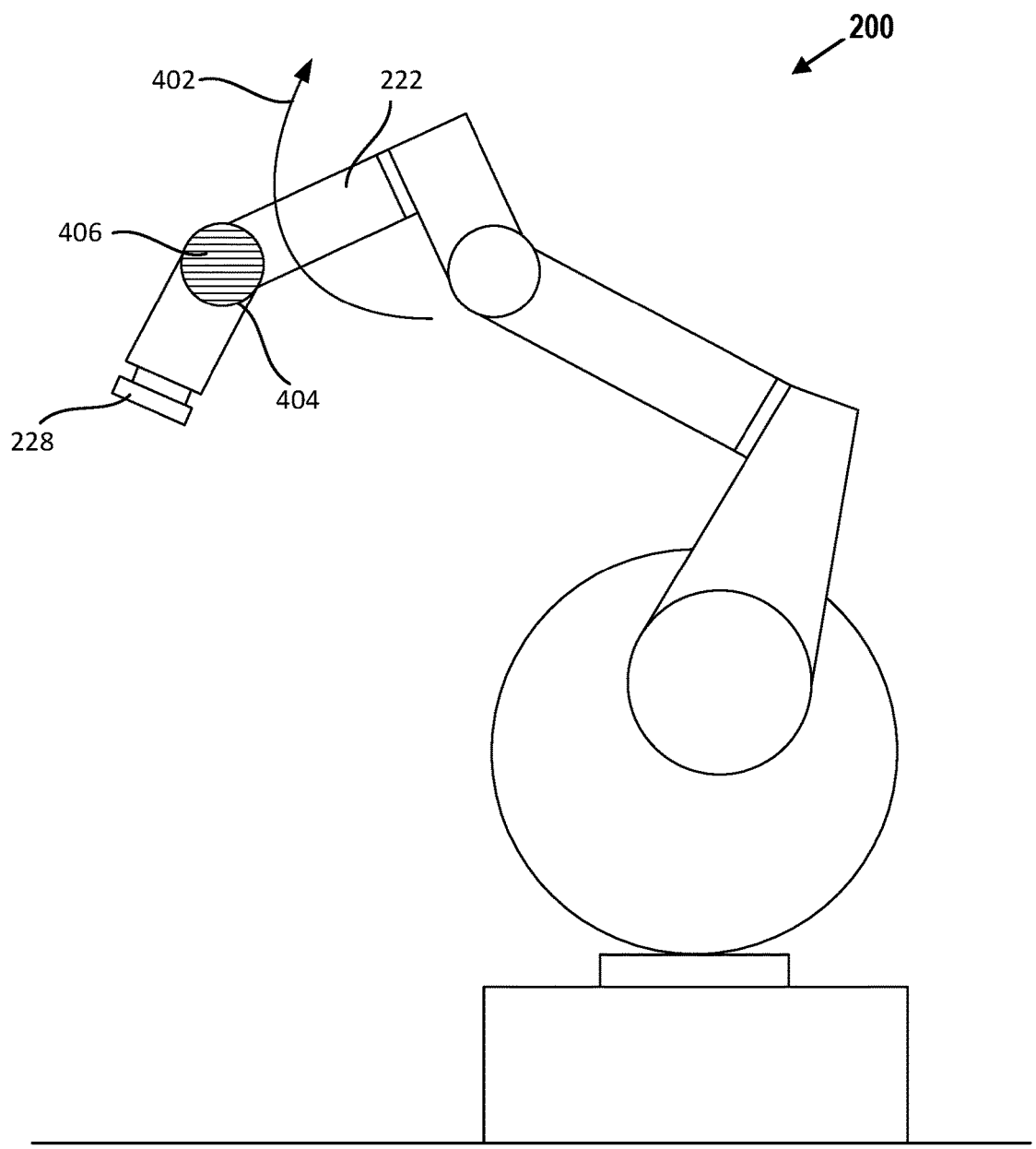
FIGS. 4A and 4B illustrate the robotic device from FIG. 2 according to an example operation.
Figure 4B:
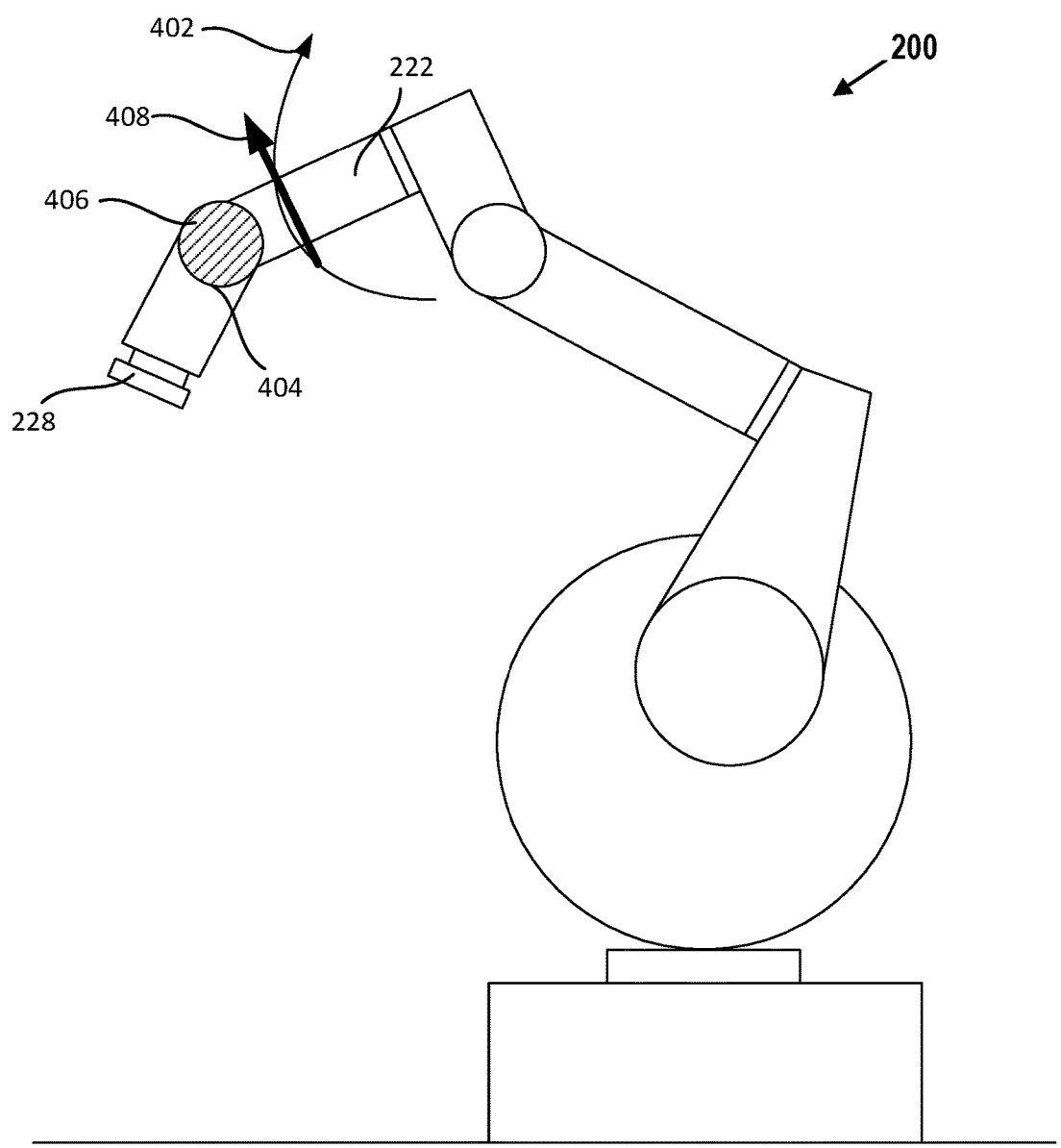

FIGS. 4A and 4B illustrate the robotic device 200 from FIG. 2 according to a given operation. FIG. 4A illustrates the robotic device 200 from FIG. 2 according to a given operation. In this instance, the final position of the robotic device 200 according to a given operation is shown. The robotic device 200 is shown to have rotated link 222 according to an upward movement based on a range of motion associated with the robotic device 200. As shown in FIG. 4A, a visual indicator 404 is located on an exterior surface proximal to an end effector of the robotic device 200.

Based on the given operation, the motion per path metric 402 associated with link 222 may be determined. The motion per path metric may be calculated according to the equation 4 from above. The calculation may include one or more of inertia, velocity, and radius of curvature associated with link 222. In one example, based on steps associated with a motion plan, the motion per path metric 402 associated with link 222 may be determined.

As shown in FIG. 4A, the motion per path metric 402 was determined according to the movement of link 222. In other examples, it may be desirable to provide an input that is indicative of a selection associated with a given component of the robotic device 200. For example, depending on the manipulator 228 that is coupled to the robotic device 200, it may be useful to determine a motion per path metric associated with the manipulator 228.

Referring to FIG. 4A, based on the motion per path metric 402, one or more processors (not shown) may be configured to determine one or more feedback characteristics that include information indicative of an effect of motion associated with the one or more components. In one example, the information indicative of the effect of motion comprises an image associated with the motion per path metric 402. In this example, the image 406 is determined according to the motion per path metric 402 being greater than a threshold. Further, the image 406 may be provided to the visual indicator 404 coupled to the robotic device 200.

FIG. 4B illustrates the robotic device 200 from FIG. 2 according to a given operation. In this instance, the final position of the robotic device 200 according to a given operation is shown. The robotic device 200 is shown to have rotated link 222 according to an upward movement. A motion per path metric 402 has been determined associated with link 222.

In one embodiment, the one or more processors are configured to determine a force applied by a given component of the one or more components based on the motion per path metric. In this instance, the one or more processors are configured to update the one or more feedback characteristics based on the force. Referring to FIG. 4B, force 408 associated with link 222 based on the motion per path metric 402 is shown. Based on the force 408, image 406 may be updated according to the feedback characteristics associated with force 408. In one example, the force 408 may be calculated based on the equation 5 from above. There may be other ways to calculate the force as well.

In another embodiment, the one or more processors are configured to determine a pressure applied by a given component of the one or more components based on the motion per path metric. In this embodiment, the one or more processors are configured to update the one or more feedback characteristics based on the pressure.

In one example, the robotic device 200 may include a controller (not shown) programmable to control the visual indicator 404 coupled to the one more components to provide feedback indicative of the effect of motion according to the one or more feedback characteristics. Within examples, the controller is configured to adjust the feedback associated with the visual indicator 404 based on a given one or more feedback characteristics associated with an upcoming operation of the robotic device 200.

Figure 5:
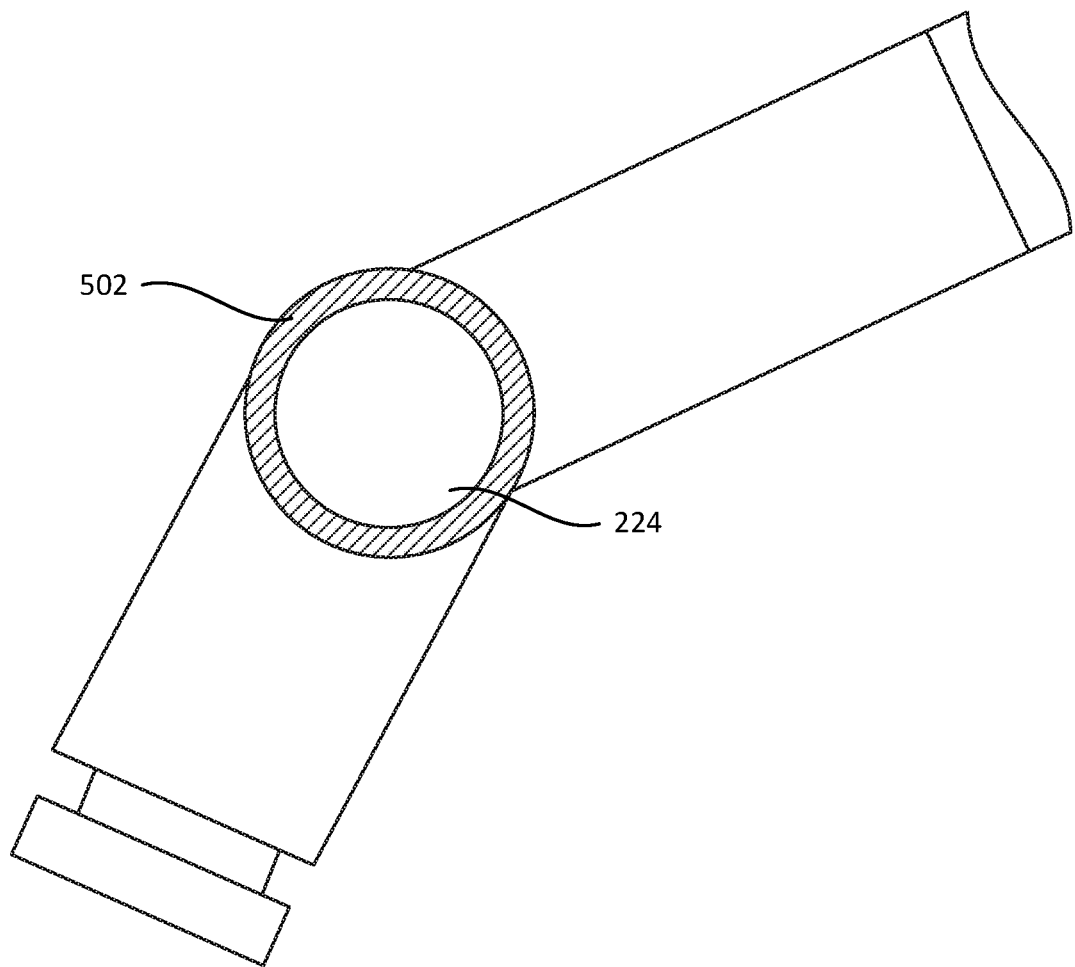
FIGS. 5-7 illustrate example indicators according to example embodiments.
Figure 6:
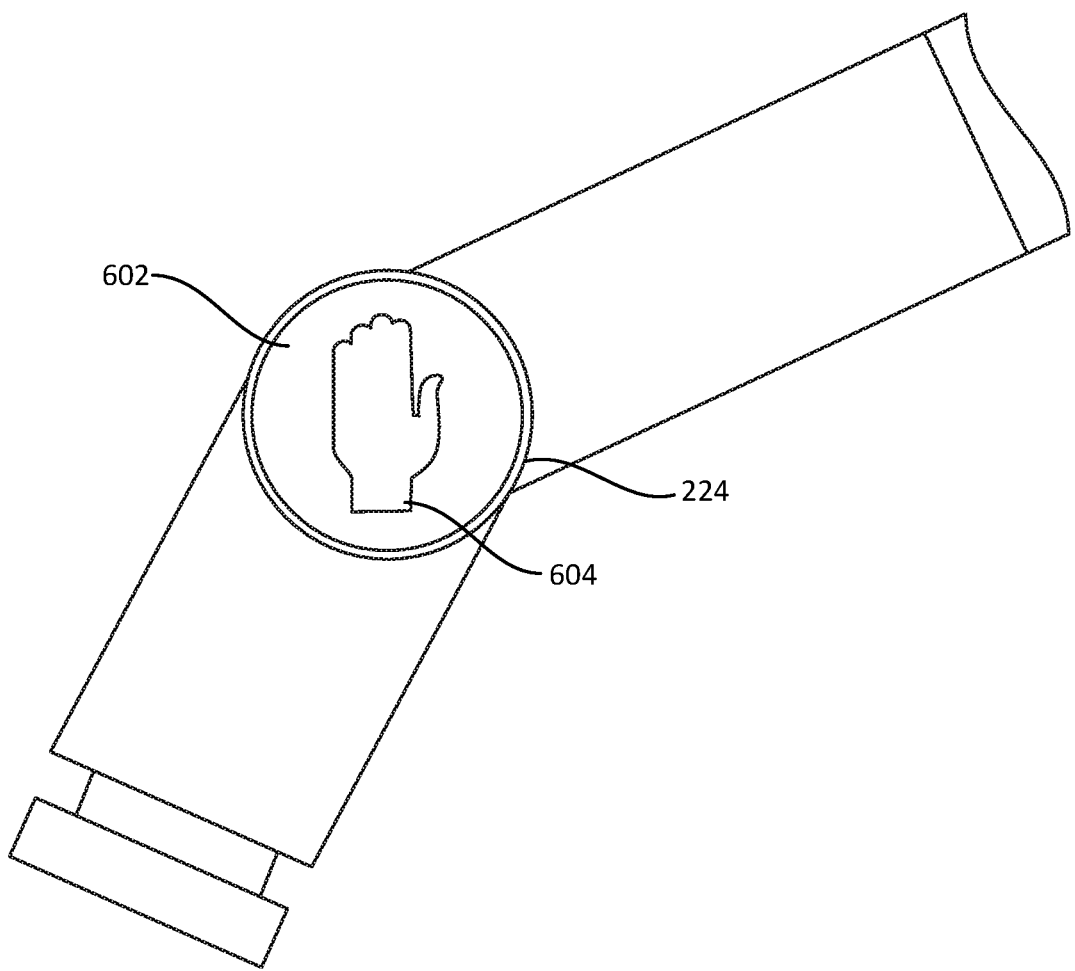
Figure 7:
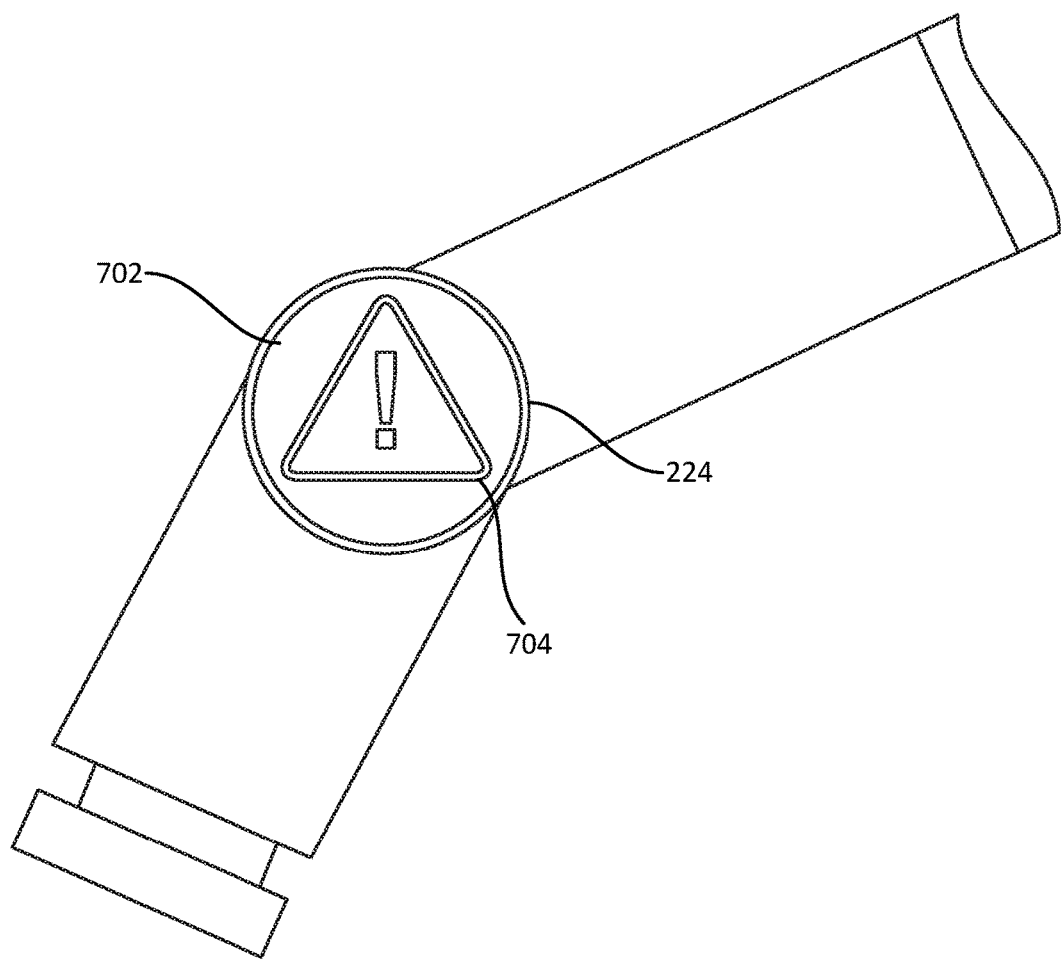

FIGS. 5-7 illustrate example indicators according to example embodiments. In one example, FIG. 5 illustrates a visual indicator 502 coupled to joint 224 of the robotic device from FIG. 2. In one embodiment, the visual indicator 502 is a circular multi-color light emitting diode (LED) array. As an example, the circular multi-color light emitting diode (LED) array is configured to provide feedback regarding an effect of motion associated with the one more components of the robotic device. The feedback may be provided by varying one or more of color and luminous intensity according to the one or more feedback characteristics. In one example, the multi-color LED may light red and increase the luminous intensity to indicate a motion per path metric greater than a threshold.

FIG. 6 illustrates another example indicator 602 coupled to a joint 224 of the robotic device from FIG. 2. The indicator 602 may be configured to display an image 604. In this example, the image 604 refers to a depiction of a hand. The image 604 may be used to inform an individual to maintain a distance to the robotic device during a given operation. In one embodiment, the image 604 may be displayed while providing an audio signal to a second indicator (not shown) as well to improve the safety associated with the robotic device.

FIG. 7 illustrates another example indicator 702 coupled to a joint 224 of the robotic device from FIG. 2. The indicator 702 may be configured to display an image 704 as shown in FIG. 7. In this instance, the image 704 may be displayed on the indicator 702 to inform an individual about an upcoming operation associated with the robotic device that may require a certain proximity to be maintained with regard to the robotic device. The image 704 may be displayed through the use of a blinking pattern in order to draw attention to an individual. The indicator 702 may not be illuminated when the robotic device is not being operated (or is off), or the indicator may also not be illuminated when a given operation of the robotic device does not require a given distance to be maintained.

Figure 8:
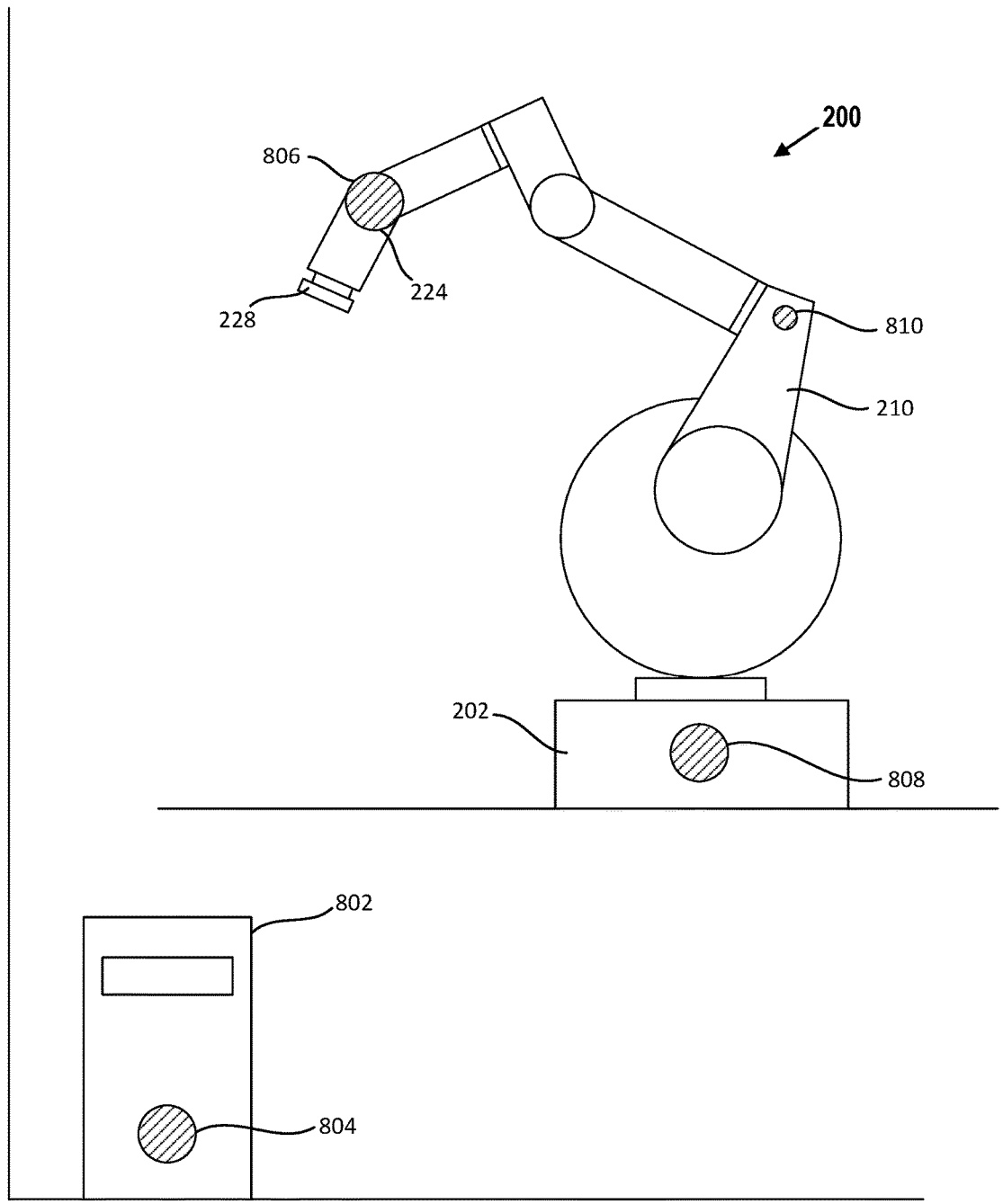
FIG. 8 illustrates an example computing system and the robotic device from FIG. 2.

FIG. 8 illustrates an example computing system 802 and the robotic device 200 from FIG. 2. The computing system 802 comprises indicator 804. The robotic device 200 comprises indicators 806, 808, and 810 coupled to an external surface of the one or more components of the robotic device 200. In one embodiment, the indicators 806, 808, and 810 are coupled to the one or more components to provide feedback about the one or more components.

Referring to FIG. 8, the computing system 802 may be configured to control the movements associated with the robotic device 200 through the use of a motion plan. As shown in FIG. 8, the computing system 802 is located remotely from the robotic device 200. The computing system 802 comprises an indicator 804 coupled to an external surface of the computing system 802.

The indicator 806 is shown coupled to joint 224, as shown in FIG. 8. Given the proximity of the indicator 806 to the end effector 228, the indicator 806 may serve as a first point of identification to an individual with regard to a safety associated with the robotic device 200. The robotic device 200 may be configured to move various links in order to achieve a given operation and therefore a line of sight to the indicator 806 may be obstructed.

The indicator 808 may be coupled to the base 202 of the robotic device 200. In one example, if the indicator 806 is not visible from a certain viewing angle, it may be possible to view indicator 808. Within examples, indicator 806 and 808 are configured to provide the same feedback indicative of the effect of motion according to the one or more feedback characteristics.

As shown in FIG. 8, indicator 810 may be coupled to link 210. The indicator 810 may provide an additional layer of redundancy with regard to providing feedback indicative of the effect of motion according to the one or more feedback characteristics. The indicator 810 may also be configured to provide the same feedback as indicators 806 and 808. As shown, the size of indicator 810 may be different than the size of indicators 806 and 808. The placement of any of the indicators 806, 808, and 810 and/or the use of additional indicators may be possible.

The indicator 804 would allow an individual to determine a safety level associated with the robotic device 200. In one instance, indicator 804 is configured to provide the same feedback that is provided by indicators 806, 808, and 810. Indicator 804 may be helpful if indicators 806, 808, and 810 are not viewable from a given position. In one embodiment, the computing system 802 may comprise a computing device 100 from FIG. 1 configured to provide information indicative of the one or more feedback characteristics. In this embodiment, the information indicative of the one or more feedback characteristics is provided to visual indicator 804 which is located remotely from the robotic device 200.

Figure 9:
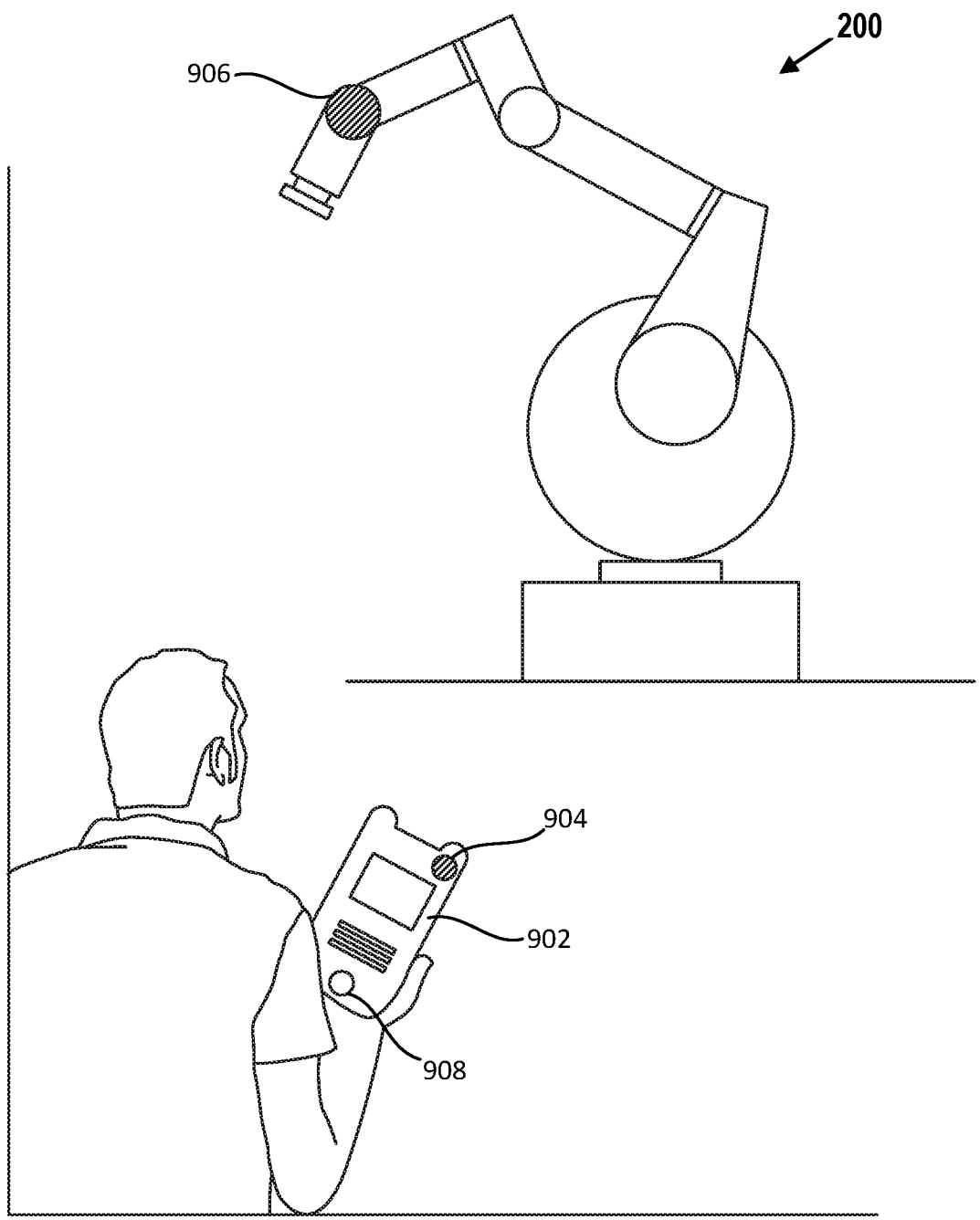
FIG. 9 illustrates another example computing device and the robotic device from FIG. 2.

FIG. 9 illustrates another example computing device 902 and the robotic device 200 from FIG. 2. The computing device 902 may be handheld and used to control the robotic device 200. The computing device 902 comprises an indicator 904. In one example, the indicator 904 is configured to provide visual feedback associated with a given operation of the robotic device 200.

Within examples, the computing device 902 may allow an individual to view the indicator 904 and ascertain whether or not it is safe to approach the robotic device 200. This may be helpful when the robotic device 200 is performing an operation that prevents the indicator 906 coupled to the robotic device 200 from being seen by the individual.

In another example, the computing device 902 comprises an additional indicator 908 that is capable of providing an audio signal such as a speaker. Multiple indicators could allow the user to receive feedback through the use of visual and audio feedback. In one embodiment, the computing device 902 may comprise a haptic feedback system that enables a vibration to occur depending on the feedback characteristics.

As shown, the indicator 904 coupled to the computing device 902 is configured to provide the same feedback as the indicator 906 coupled to the robotic device 200. In another example, the computing device 902 may be configured as a robotic teaching pendant. In this example, an individual would be able to view the feedback associated with a given step of a motion plan in order to develop a motion plan that is optimized for safety. Other example uses of the computing device 902 are possible as well.

Figure 10:
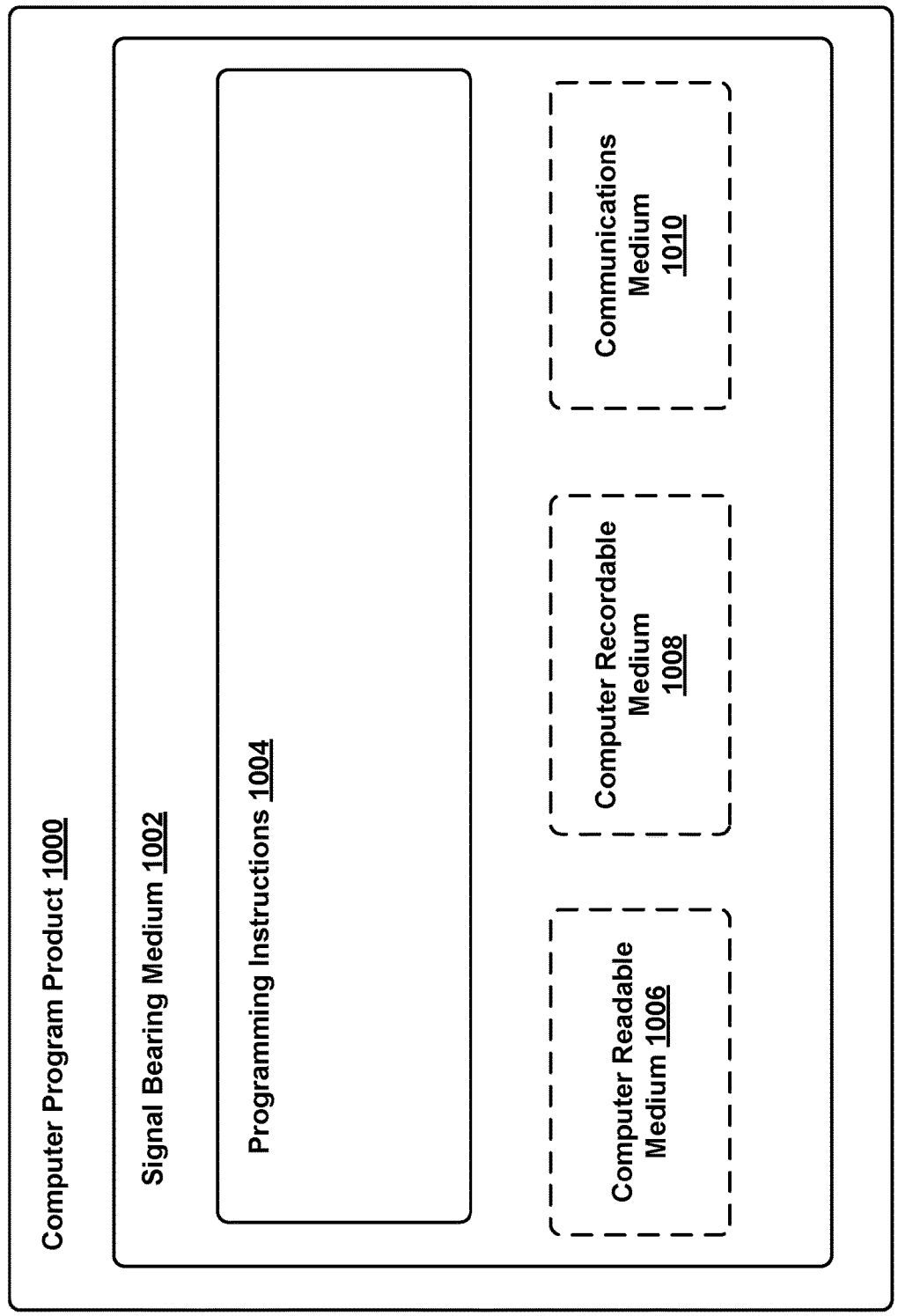
FIG. 10 depicts an example computer readable medium configured according to an example embodiment.

FIG. 10 depicts an example computer readable medium configured according to an example embodiment. In example embodiments, an example system may include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g., functions of the device 100, method 300, etc.) may be implemented by computer program instructions encoded on a computer readable storage media in a machine-readable format, or on other media or articles of manufacture. FIG. 10 is a schematic illustrating a conceptual partial view of an example computer program product that includes a computer program for executing a computer process on a computing device, arranged according to at least some embodiments disclosed herein.

In one embodiment, the example computer program product 1000 is provided using a signal bearing medium 1002. The signal bearing medium 1002 may include one or more programming instructions 1004 that, when executed by one or more processors may provide functionality or portions of the functionality described above with respect to FIGS. 1-9. In some examples, the signal bearing medium 1002 may be a computer-readable medium 1006, such as, but not limited to, a hard disk drive, a Compact Disc (CD), a Digital Video Disk (DVD), a digital tape, memory, etc. In some implementations, the signal bearing medium 1002 may be a computer recordable medium 1008, such as, but not limited to, memory, read/write (R/W) CDs, R/W DVDs, etc. In some implementations, the signal bearing medium 1002 may be a communication medium 1010 (e.g., a fiber optic cable, a waveguide, a wired communications link, etc.). Thus, for example, the signal bearing medium 1002 may be conveyed by a wireless form of the communications medium 1010.

The one or more programming instructions 1004 may be, for example, computer executable and/or logic implemented instructions. In some examples, a computing device may be configured to provide various operations, functions, or actions in response to the programming instructions 1004 conveyed to the computing device by one or more of the computer readable medium 1006, the computer recordable medium 1008, and/or the communications medium 1010.

The computer readable medium 1006 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
receiving an input indicative of operational information associated with a robotic device;
determining a motion per path metric at one or more positions of the robotic device according to the operational information;
determining a force associated with the motion per path metric at the one or more positions;
based on the motion per path metric and the force, determining, by one or more processors, one or more feedback characteristics, wherein the one or more feedback characteristics vary according to an effect of motion at the one or more positions;
providing, to an indicator coupled to the robotic device, information indicative of the one or more feedback characteristics, wherein the information indicative of the one or more feedback characteristics is associated with an upcoming operation of the robotic device and includes a visual characteristic that indicates a proximity perimeter area related to a distance around the robotic device needed for the upcoming operation of the robotic device; and
displaying the visual characteristic by the indicator prior to the robotic device performing the upcoming operation so as to inform of the proximity perimeter area prior to the robotic device performing the operation.

2. The method of claim 1, further comprising:
based on the force being greater than a threshold at the one or more positions, providing to the indicator information informing of possible dangerous motion by the robotic device within the proximity perimeter area around the robotic device needed for operation of the robotic device.

3. The method of claim 1, further comprising:
based on the force being less than a threshold at the one or more positions, providing to the indicator information informing of safe motion by the robotic device within the proximity perimeter area around the robotic device needed for operation of the robotic device.

4. The method of claim 1, wherein the operational information comprises one or more power requirements associated with the robotic device, geometric information associated with one or more components of the robotic device, and a motion plan associated with the robotic device.

5. The method of claim 1, wherein the indicator comprises a visual indicator.

6. The method of claim 1, further comprising:
determining that the force is greater than a threshold at the one or more positions;
determining a time period prior to a start of the operation; and
based on the time period, adjusting the indicator to display a given color, wherein the given color is associated with an upcoming operation of the robotic device.

7. The method of claim 1, further comprising:
providing, to a second indicator located remotely from the robotic device, information indicative of the one or more feedback characteristics.

8. The method of claim 1, wherein the information indicative of the one or more feedback characteristics further includes an aural signal or a haptic signal.

9. A robotic device comprising:
one or more components configured to be actuated for movement;
one or more processors configured to determine a motion per path metric of the one or more components at one or more positions according to received operation information associated with the robotic device, and the one or more processors configured to determine a force associated with the motion per path metric at the one or more positions, and based on the motion per path metric and the force to determine one or more feedback characteristics, wherein the one or more feedback characteristics vary according to an effect of motion at the one or more positions and is associated with an upcoming operation of the robotic device so as to inform of a proximity perimeter area related to a distance around the robotic device needed for operation of the robotic device prior to the robotic device performing the operation; and
an indicator coupled to the one or more components and to the one or more processors, the indicator configured to provide feedback about the one or more components based on the feedback characteristics indicative of the effect of motion, wherein the feedback includes a visual characteristic that indicates the proximity perimeter area, and the indicator displays the visual characteristic prior to the robotic device performing the upcoming operation so as to inform of the proximity perimeter area prior to the robotic device performing the operation.

10. The robotic device of claim 9, wherein the one or more processors are further configured to:
based on the force being greater than a threshold at the one or more positions, provide to the indicator information informing of possible dangerous motion by the robotic device within the proximity perimeter area around the robotic device needed for operation of the robotic device.

11. The robotic device of claim 9, wherein the one or more processors are further configured to:
based on the force being less than a threshold at the one or more positions, provide to the indicator information informing of safe motion by the robotic device within the proximity perimeter area around the robotic device needed for operation of the robotic device.

12. The robotic device of claim 9, wherein the indicator comprises a circular multi-color light emitting diode (LED) array.

13. A robotic device comprising:
one or more actuators coupled through one or more joints to form one or more components;
one or more processors configured to determine a motion per path metric of the one or more components based on an operation of the robotic device, to determine a force associated with the motion per path metric at one or more steps of operation of the robotic device, and to determine one or more feedback characteristics based on the motion per path metric and the force, wherein the one or more feedback characteristics include information indicative of an effect of motion associated with the one or more components and is associated with an upcoming operation of the robotic device so as to inform of a proximity perimeter area related to a distance around the robotic device needed for operation of the robotic device prior to the robotic device performing the operation;
an indicator coupled to the one or more components to provide feedback about the one or more components; and
a controller programmable to control the indicator coupled to the one more components to provide the feedback according to the one or more feedback characteristics, wherein the feedback includes a visual characteristic that indicates the proximity perimeter area and the controller causes the indicator to display the visual characteristic prior to the robotic device performing the upcoming operation so as to inform of the proximity perimeter area prior to the robotic device performing the operation.

14. The robotic device of claim 13, wherein the indicator is located on an exterior surface proximal to an end effector of the robotic device.

15. The robotic device of claim 13, further comprising:
a plurality of visual indicators coupled to the one or more components to provide feedback about the one or more components.

16. The robotic device of claim 13, wherein the controller is configured to adjust the feedback associated with the indicator based on a given one or more feedback characteristics associated with the upcoming operation of the robotic device based on the motion per path metric being greater than a threshold.

* * * * *